US012687887B2

(12) United States Patent
Carnevali

(10) Patent No.: US 12,687,887 B2
(45) Date of Patent: Jul. 21, 2026

(54) DOCK WITH A ROTATABLE MOUNT FOR MOBILE DEVICES AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 233 days.

(21) Appl. No.: 18/638,430

(22) Filed: Apr. 17, 2024

(65) Prior Publication Data
US 2025/0328164 A1 Oct. 23, 2025

(51) Int. Cl.
*G06F 1/16* (2006.01)
*F16M 11/06* (2006.01)
(Continued)

(52) U.S. Cl.
CPC ........... *G06F 1/1632* (2013.01); *F16M 11/06* (2013.01); *F16M 13/02* (2013.01); *G06F 1/1601* (2013.01);
(Continued)

(58) Field of Classification Search
CPC .... G06F 1/1632; G06F 1/1601; G06F 1/1626; F16M 11/06; F16M 13/02; H04M 1/04;
(Continued)

(56) References Cited

U.S. PATENT DOCUMENTS 809,977 A 1/1906 O'Brien
1,786,459 A 12/1930 Simons
(Continued)

FOREIGN PATENT DOCUMENTS

CN 1312603 9/2001
CN 101674096 3/2010
(Continued)

OTHER PUBLICATIONS

U.S. Appl. No. 18/404,795, filed Jan. 4, 2024.
(Continued)

*Primary Examiner* — Allen L Parker
*Assistant Examiner* — Martin Antonio Asmat Uceda
(74) *Attorney, Agent, or Firm* — Branch Partners PLLC; Bruce E. Black

(57) ABSTRACT

A dock for a mobile device includes a base for attachment to a wall or other surface; a rotatable mount rotatably coupled to the base, the rotatable mount including an anchoring mount and a bottom device receiver, the rotatable mount further including either a) a docking button indentation for receiving a docking button coupled to the mobile device or b) a docking button extending from a remainder of the anchoring mount, wherein at least one of the bottom device receiver, the docking button indentation, or the docking button includes a plurality of electrical contacts for making contact with contacts on the mobile device or the case; and a cord electrically coupled to at least one of the electrical contacts, extending into the base, and configured for coupling to a power source, a data source, or a data receiver.

20 Claims, 5 Drawing Sheets

(51) Int. Cl.
   *F16M 13/02*      (2006.01)
   *H04M 1/04*      (2006.01)
   *H04M 1/06*      (2006.01)
(52) U.S. Cl.
   CPC ............ *G06F 1/1626* (2013.01); *H04M 1/04*
               (2013.01); *H04M 1/06* (2013.01)
(58) Field of Classification Search
   CPC .... H04M 1/06; H04M 1/0249; H04M 1/0274;
            H04M 1/724; A45C 11/002; H01R 31/06;
                    H04B 1/3888; H05K 7/00
   See application file for complete search history.

(56) References Cited

U.S. PATENT DOCUMENTS

| | | | |
|---|---|---|---|
| 2,495,552 | A | 1/1950 | Schmitz |
| 2,549,917 | A | 4/1951 | Millbrandt |
| 2,565,939 | A | 8/1951 | Wriston |
| 2,612,947 | A | 10/1952 | Jenks |
| 2,717,093 | A | 9/1955 | Mautner |
| 2,803,368 | A | 8/1957 | Koch |
| 3,018,525 | A | 1/1962 | Deisenroth |
| 3,140,883 | A | 7/1964 | Anthony |
| 3,464,579 | A | 9/1969 | Asenbauer |
| 3,667,648 | A | 6/1972 | Koziol |
| 3,808,577 | A | 4/1974 | Mathauser |
| 3,885,701 | A | 5/1975 | Becklin |
| 3,972,459 | A | 8/1976 | Cooper |
| 3,978,830 | A | 9/1976 | Toth, Jr. |
| 4,298,204 | A | 11/1981 | Jinkins |
| 4,564,880 | A | 1/1986 | Christ et al. |
| 4,607,772 | A | 8/1986 | Hancock |
| 4,828,558 | A | 5/1989 | Kelman |
| 4,842,174 | A | 6/1989 | Sheppard et al. |
| 4,848,319 | A | 7/1989 | Appeldorn |
| 5,002,184 | A | 3/1991 | Lloyd |
| 5,052,943 | A | 10/1991 | Davis |
| 5,096,317 | A | 3/1992 | Phillippe |
| 5,135,189 | A | 8/1992 | Ghazizadeh |
| 5,246,133 | A | 9/1993 | James |
| 5,272,771 | A | 12/1993 | Ansell et al. |
| 5,295,602 | A | 3/1994 | Swanson |
| 5,353,934 | A | 10/1994 | Yamauchi |
| 5,388,692 | A | 2/1995 | Withrow et al. |
| 5,457,745 | A | 10/1995 | Wang |
| 5,535,274 | A | 7/1996 | Braitberg et al. |
| 5,584,054 | A | 12/1996 | Tyneski et al. |
| 5,586,002 | A | 12/1996 | Notarianni |
| 5,629,833 | A * | 5/1997 | Ido ........................ G06F 1/1616 |
| | | | 361/679.01 |
| 5,641,065 | A | 6/1997 | Owens et al. |
| 5,646,649 | A | 7/1997 | Iwata et al. |
| 5,708,707 | A | 1/1998 | Halttunen et al. |
| 5,791,506 | A | 8/1998 | Sheffler et al. |
| 5,813,096 | A | 9/1998 | Soennichsen |
| 5,822,427 | A | 10/1998 | Braitberg et al. |
| 5,842,670 | A | 12/1998 | Nigoghosian |
| 5,845,885 | A | 12/1998 | Carnevali |
| 5,860,550 | A | 1/1999 | Miller et al. |
| 5,888,087 | A | 3/1999 | Hanson et al. |
| 5,895,018 | A | 4/1999 | Rielo |
| 5,953,795 | A | 9/1999 | Bauer |
| 5,969,057 | A | 10/1999 | Schoeley et al. |
| 5,990,874 | A | 11/1999 | Tsumura et al. |
| 5,992,807 | A | 11/1999 | Tarulli |
| 6,009,601 | A | 1/2000 | Kaufman |
| 6,010,005 | A | 1/2000 | Reames et al. |
| 6,032,910 | A | 3/2000 | Richter |
| 6,034,505 | A | 3/2000 | Arthur et al. |
| 6,035,800 | A | 3/2000 | Clifford |
| 6,043,626 | A | 3/2000 | Snyder et al. |
| 6,068,119 | A | 5/2000 | Derr et al. |
| 6,149,116 | A | 11/2000 | Won |
| 6,191,943 | B1 | 2/2001 | Tracy |

| | | | |
|---|---|---|---|
| D439,218 | S | 3/2001 | Yu |
| 6,229,893 | B1 | 5/2001 | Chen |
| 6,273,773 | B1 | 8/2001 | Bourke |
| 6,276,552 | B1 | 8/2001 | Vervisch |
| 6,295,198 | B1 | 9/2001 | Loh et al. |
| 6,317,313 | B1 | 11/2001 | Mosgrove et al. |
| 6,341,218 | B1 | 1/2002 | Poplawsky et al. |
| 6,356,053 | B1 | 3/2002 | Sandoz et al. |
| 6,377,825 | B1 | 4/2002 | Kennedy et al. |
| 6,392,882 | B1 | 5/2002 | Chen et al. |
| 6,406,758 | B1 | 6/2002 | Bottari et al. |
| 6,407,860 | B1 | 6/2002 | Funazaki et al. |
| 6,438,229 | B1 | 8/2002 | Overy et al. |
| 6,561,476 | B2 | 5/2003 | Carnevali |
| 6,565,363 | B2 | 5/2003 | Downing |
| 6,572,176 | B2 | 6/2003 | Davies et al. |
| 6,585,212 | B2 | 7/2003 | Carnevali |
| 6,588,637 | B2 | 7/2003 | Gates et al. |
| 6,597,924 | B1 | 7/2003 | Smith |
| 6,614,423 | B1 | 9/2003 | Wong et al. |
| 6,646,864 | B2 | 11/2003 | Richardson |
| 6,648,376 | B2 | 11/2003 | Christianson |
| 6,687,516 | B2 | 2/2004 | Chen |
| 6,702,604 | B1 | 3/2004 | Moscovitch |
| 6,714,802 | B1 | 3/2004 | Barvesten |
| 6,754,343 | B2 | 6/2004 | Lundstrom et al. |
| 6,762,585 | B2 | 7/2004 | Liao |
| 6,776,422 | B1 | 8/2004 | Toy |
| 6,785,566 | B1 | 8/2004 | Irizarry |
| 6,785,567 | B2 | 8/2004 | Kato |
| 6,816,713 | B2 | 11/2004 | Chen |
| 6,842,171 | B2 | 1/2005 | Richter et al. |
| 6,953,126 | B2 | 10/2005 | Parker et al. |
| 6,984,680 | B2 | 1/2006 | Quinn |
| 6,995,976 | B2 | 2/2006 | Richardson |
| 7,014,486 | B1 * | 3/2006 | Wu ........................ H04M 1/04 |
| | | | 439/165 |
| 7,017,243 | B2 | 3/2006 | Carnevali |
| 7,031,148 | B1 | 4/2006 | Lin |
| 7,054,042 | B2 | 5/2006 | Holmes et al. |
| 7,068,783 | B2 | 6/2006 | Peiker |
| 7,158,376 | B2 | 1/2007 | Richardson et al. |
| 7,180,735 | B2 | 2/2007 | Thomas et al. |
| 7,203,058 | B2 | 4/2007 | Hong |
| 7,230,823 | B2 | 6/2007 | Richardson et al. |
| 7,236,356 | B2 | 6/2007 | Ulla et al. |
| 7,248,901 | B2 | 7/2007 | Peiker |
| 7,257,429 | B2 | 8/2007 | Kogan |
| 7,283,849 | B2 | 10/2007 | Peiker |
| 7,311,526 | B2 | 12/2007 | Rohrbach et al. |
| 7,312,984 | B2 | 12/2007 | Richardson et al. |
| 7,320,450 | B2 | 1/2008 | Carnevali |
| 7,329,128 | B1 | 2/2008 | Awad |
| 7,351,066 | B2 | 4/2008 | DiFonzo et al. |
| 7,430,674 | B2 | 9/2008 | von Mueller et al. |
| 7,464,814 | B2 | 12/2008 | Carnevali |
| 7,480,138 | B2 | 1/2009 | Kogan et al. |
| 7,481,664 | B1 | 1/2009 | Knoll et al. |
| 7,517,222 | B2 | 4/2009 | Rohrbach et al. |
| 7,520,389 | B2 | 4/2009 | Lalouette |
| 7,551,458 | B2 | 6/2009 | Carnevali |
| 7,566,224 | B2 | 7/2009 | Wu |
| 7,573,706 | B2 | 8/2009 | Carnevali |
| 7,594,576 | B2 | 9/2009 | Chen et al. |
| 7,609,512 | B2 | 10/2009 | Richardson et al. |
| 7,612,997 | B1 | 11/2009 | Diebel et al. |
| 7,625,212 | B2 | 12/2009 | Du |
| 7,641,477 | B2 | 1/2010 | DiFonzo et al. |
| 7,645,143 | B2 | 1/2010 | Rohrbach et al. |
| 7,663,879 | B2 | 2/2010 | Richardson et al. |
| 7,688,580 | B2 | 3/2010 | Richardson et al. |
| 7,775,801 | B2 | 8/2010 | Shiff et al. |
| 7,782,610 | B2 | 8/2010 | Diebel et al. |
| 7,812,567 | B2 | 10/2010 | Shen |
| 7,841,776 | B2 | 11/2010 | DiFonzo et al. |
| 7,850,032 | B2 | 12/2010 | Carnevali et al. |
| 7,855,529 | B2 | 12/2010 | Liu |
| RE42,060 | E | 1/2011 | Carnevali |
| 7,889,489 | B2 | 2/2011 | Richardson et al. |

(56) References Cited

U.S. PATENT DOCUMENTS

| | | | | |
|---|---|---|---|---|
| 7,889,498 B2 | 2/2011 | Diebel et al. | | |
| 7,894,180 B2 | 2/2011 | Carnevali | | |
| 7,901,216 B2 | 3/2011 | Rohrbach et al. | | |
| 7,907,394 B2 | 3/2011 | Richardson et al. | | |
| 7,911,779 B1 | 3/2011 | Tarnoff | | |
| 7,946,868 B1 | 5/2011 | Chen | | |
| 7,946,891 B2 | 5/2011 | Peiker | | |
| 7,970,440 B2 | 6/2011 | Bury | | |
| RE42,581 E | 8/2011 | Carnevali | | |
| 7,997,554 B2 | 8/2011 | Carnevali | | |
| 8,054,042 B2 | 11/2011 | Griffin, Jr. et al. | | |
| 8,061,516 B2 | 11/2011 | Carnevali | | |
| 8,062,078 B2 | 11/2011 | Asai et al. | | |
| 8,074,951 B2 | 12/2011 | Carnevali | | |
| 8,080,975 B2 | 12/2011 | Bessa et al. | | |
| 8,087,939 B2 | 1/2012 | Rohrbach et al. | | |
| 8,099,138 B2 | 1/2012 | Piekarz | | |
| 8,113,873 B1 * | 2/2012 | Sarraf | H01R 13/6315 | |
| | | | | 439/533 |
| 8,167,624 B2 | 5/2012 | Hartlef et al. | | |
| 8,172,580 B1 | 5/2012 | Chen et al. | | |
| 8,177,178 B2 | 5/2012 | Carnevaali | | |
| 8,177,560 B2 | 5/2012 | Rohrbach et al. | | |
| 8,179,672 B2 | 5/2012 | Carnevali | | |
| 8,183,825 B2 | 5/2012 | Sa | | |
| 8,224,408 B2 | 7/2012 | Tomasini et al. | | |
| 8,295,043 B2 | 10/2012 | Tai et al. | | |
| RE43,806 E | 11/2012 | Carnevali | | |
| 8,367,235 B2 | 2/2013 | Huang | | |
| 8,369,082 B2 * | 2/2013 | Madonna | G06F 1/1632 | |
| | | | | 361/679.56 |
| 8,390,255 B1 | 3/2013 | Fathollahi | | |
| 8,405,974 B2 | 3/2013 | Sayavong | | |
| 8,414,312 B2 | 4/2013 | Hung et al. | | |
| 8,430,240 B2 | 4/2013 | Kim | | |
| 8,435,042 B2 | 5/2013 | Rohrbach et al. | | |
| 8,453,835 B2 | 6/2013 | So | | |
| 8,454,178 B2 | 6/2013 | Carnevali | | |
| 8,457,701 B2 | 6/2013 | Diebel | | |
| 8,483,758 B2 | 7/2013 | Huang | | |
| 8,497,753 B2 | 7/2013 | DiFonzo et al. | | |
| 8,505,861 B2 | 8/2013 | Carnevali | | |
| 8,531,833 B2 | 9/2013 | Diebel et al. | | |
| 8,553,408 B2 * | 10/2013 | Supran | G06F 1/1632 | |
| | | | | 361/679.02 |
| 8,560,014 B1 | 10/2013 | Hu et al. | | |
| 8,634,887 B2 | 1/2014 | Hu et al. | | |
| 8,639,288 B1 | 1/2014 | Friedman | | |
| 8,646,698 B2 | 2/2014 | Chen et al. | | |
| 8,675,359 B2 | 3/2014 | Chen | | |
| 8,690,582 B2 | 4/2014 | Rohrbach et al. | | |
| 8,702,316 B2 | 4/2014 | DiFonzo et al. | | |
| 8,729,854 B2 | 5/2014 | Tsai et al. | | |
| 8,760,311 B2 | 6/2014 | Heaton | | |
| 8,763,802 B2 | 7/2014 | Ellis-Brown | | |
| 8,801,441 B2 | 8/2014 | Zhang et al. | | |
| 8,825,123 B1 | 9/2014 | Gudino | | |
| 8,833,716 B2 | 9/2014 | Funk et al. | | |
| 8,844,817 B2 * | 9/2014 | Glanzer | G06K 7/10009 | |
| | | | | 235/375 |
| 8,873,233 B2 | 10/2014 | Reber et al. | | |
| D718,293 S | 11/2014 | Namminga | | |
| 8,891,800 B1 | 11/2014 | Shaffer | | |
| 8,894,420 B2 | 11/2014 | Schichl et al. | | |
| 8,907,783 B2 | 12/2014 | Fish et al. | | |
| 8,911,246 B2 | 12/2014 | Carnevali | | |
| 8,917,506 B2 | 12/2014 | Diebel et al. | | |
| 8,929,065 B2 | 1/2015 | Williams | | |
| 8,950,717 B2 * | 2/2015 | Chuang | F16M 13/00 | |
| | | | | 248/316.4 |
| 8,970,332 B2 | 3/2015 | DiFonzo et al. | | |
| 9,007,758 B2 | 4/2015 | Wilson et al. | | |
| 9,011,184 B2 | 4/2015 | Chen et al. | | |
| 9,019,698 B2 * | 4/2015 | Thiers | F16M 13/00 | |
| | | | | 320/108 |
| 9,026,187 B2 | 5/2015 | Huang | | |
| 9,036,343 B2 | 5/2015 | Carnevali | | |
| 9,071,060 B2 | 6/2015 | Fathollahi | | |
| 9,072,172 B2 | 6/2015 | Hsu | | |
| 9,077,794 B2 | 7/2015 | Narendra et al. | | |
| 9,089,059 B1 | 7/2015 | Haskin et al. | | |
| 9,112,304 B2 | 8/2015 | Rohrbach et al. | | |
| 9,123,935 B2 | 9/2015 | Huang | | |
| 9,147,966 B2 | 9/2015 | An | | |
| 9,172,781 B1 | 10/2015 | Goldstein | | |
| 9,195,279 B2 | 11/2015 | Carnevali et al. | | |
| 9,201,593 B2 | 12/2015 | Collopy et al. | | |
| 9,229,494 B2 | 1/2016 | Rayner | | |
| 9,288,295 B2 | 3/2016 | Ivanovski et al. | | |
| 9,298,661 B2 | 3/2016 | Hamel et al. | | |
| 9,300,078 B2 | 3/2016 | Liu et al. | | |
| 9,300,081 B2 | 3/2016 | Rudisill et al. | | |
| 9,331,444 B2 | 5/2016 | Carnevali | | |
| 9,356,267 B1 | 5/2016 | To et al. | | |
| 9,495,375 B2 | 11/2016 | Huang et al. | | |
| 9,529,387 B2 | 12/2016 | Carnevali | | |
| 9,535,457 B1 | 1/2017 | Vier | | |
| 9,567,776 B2 * | 2/2017 | Moock | F16M 11/041 | |
| 9,591,113 B2 | 3/2017 | Filser et al. | | |
| 9,602,639 B2 | 3/2017 | Carnevali | | |
| 9,611,881 B2 * | 4/2017 | Khodapanah | F16B 21/06 | |
| 9,632,535 B2 | 4/2017 | Carnevali et al. | | |
| 9,647,474 B2 | 5/2017 | Fathollahi et al. | | |
| 9,706,026 B2 | 7/2017 | Carnevali | | |
| 9,742,885 B2 | 8/2017 | Rostami | | |
| 9,748,535 B2 | 8/2017 | Huang et al. | | |
| 9,760,116 B2 * | 9/2017 | Wylie | G06F 1/1654 | |
| 9,762,013 B2 * | 9/2017 | George | H05K 5/0247 | |
| 9,774,713 B2 | 9/2017 | Guerdrum et al. | | |
| 9,776,577 B2 | 10/2017 | Carnevali | | |
| 9,807,211 B2 | 10/2017 | Guerdrum et al. | | |
| 9,809,175 B2 | 11/2017 | Jonik et al. | | |
| 9,817,441 B1 | 11/2017 | Kuo | | |
| 9,831,904 B1 | 11/2017 | Carnevali | | |
| 9,898,041 B2 | 2/2018 | Blowers et al. | | |
| 9,915,976 B2 * | 3/2018 | Johnson | B60R 11/00 | |
| 9,924,005 B1 | 3/2018 | McElderry | | |
| 9,939,850 B2 | 4/2018 | Hoellwarth et al. | | |
| 10,033,204 B2 | 7/2018 | Huang et al. | | |
| 10,050,658 B2 | 8/2018 | Carnevali | | |
| 10,054,984 B2 | 8/2018 | Carnevali et al. | | |
| 10,148,104 B2 | 12/2018 | Sa | | |
| 10,170,738 B2 | 1/2019 | Huang et al. | | |
| 10,172,246 B2 | 1/2019 | Apter | | |
| 10,330,251 B2 | 6/2019 | Carnevali | | |
| 10,389,399 B2 | 8/2019 | Carnevali | | |
| 10,401,905 B2 | 9/2019 | Carnevali | | |
| 10,416,715 B1 | 9/2019 | Wade et al. | | |
| 10,454,515 B2 | 10/2019 | Carnevali | | |
| 10,485,312 B2 | 11/2019 | Rodriguez | | |
| 10,516,431 B2 | 12/2019 | DiLella | | |
| 10,548,380 B2 | 2/2020 | Rayner et al. | | |
| 10,559,788 B2 | 2/2020 | Huang et al. | | |
| 10,630,334 B2 | 4/2020 | Carnevali | | |
| 10,656,687 B2 | 5/2020 | Tashiro et al. | | |
| 10,666,309 B2 | 5/2020 | Carnevali | | |
| 10,707,632 B1 | 7/2020 | Yamamoto et al. | | |
| 10,714,953 B1 | 7/2020 | Solana et al. | | |
| 10,778,275 B2 | 9/2020 | Carnevali | | |
| 10,788,857 B2 | 9/2020 | Huang et al. | | |
| 10,812,643 B1 | 10/2020 | Carnevali et al. | | |
| D903,685 S | 12/2020 | Wright et al. | | |
| 10,928,856 B1 | 2/2021 | Hamlin et al. | | |
| 10,965,052 B2 * | 3/2021 | Shikanai | F16C 41/04 | |
| D915,373 S | 4/2021 | Zhou | | |
| 10,976,777 B2 | 4/2021 | Pischel | | |
| 11,029,731 B1 | 6/2021 | Carnevali | | |
| D924,863 S | 7/2021 | Wright et al. | | |
| 11,076,032 B1 | 7/2021 | Carnevali | | |
| 11,165,458 B2 | 11/2021 | Carnevali | | |
| 11,277,506 B2 | 3/2022 | Carnevali | | |
| 11,289,864 B2 | 3/2022 | Carnevali et al. | | |

(56) References Cited

U.S. PATENT DOCUMENTS

| | | | |
|---|---|---|---|
| 11,489,350 B2 | 11/2022 | Carnevali | |
| 11,522,379 B2 | 12/2022 | Lee et al. | |
| 11,597,334 B2 | 3/2023 | Telesco et al. | |
| 11,619,971 B1 | 4/2023 | Passe et al. | |
| 11,622,032 B2 | 4/2023 | Wright et al. | |
| 11,652,326 B2 | 5/2023 | Carnevali | |
| 11,977,412 B2* | 5/2024 | Miles | F16M 11/22 |
| 12,132,511 B2 | 10/2024 | Carnevali | |
| D1,052,884 S | 12/2024 | Hong | |
| 2002/0009194 A1 | 1/2002 | Wong et al. | |
| 2002/0032041 A1 | 3/2002 | Hirai et al. | |
| 2002/0136557 A1 | 9/2002 | Shimamura | |
| 2002/0191782 A1* | 12/2002 | Beger | H04M 1/04 |
| | | | 379/454 |
| 2002/0193136 A1 | 12/2002 | Halkosaari et al. | |
| 2003/0068986 A1 | 4/2003 | Oh | |
| 2003/0116631 A1 | 6/2003 | Salvato et al. | |
| 2003/0218445 A1 | 11/2003 | Behar | |
| 2004/0108348 A1 | 6/2004 | Barnes | |
| 2004/0209489 A1 | 10/2004 | Clapper | |
| 2005/0189354 A1 | 9/2005 | Heather et al. | |
| 2006/0058073 A1 | 3/2006 | Kim | |
| 2006/0175766 A1 | 8/2006 | Carnevali | |
| 2007/0127204 A1 | 6/2007 | Muenzer et al. | |
| 2007/0261978 A1 | 11/2007 | Sanderson | |
| 2008/0053770 A1 | 3/2008 | Tynyk | |
| 2008/0104301 A1 | 5/2008 | Assouad et al. | |
| 2008/0149796 A1 | 6/2008 | Moscovitch | |
| 2008/0273734 A1 | 11/2008 | Solland | |
| 2008/0320190 A1 | 12/2008 | Lydon et al. | |
| 2009/0021903 A1 | 1/2009 | Chen et al. | |
| 2009/0140113 A1 | 6/2009 | Carnevali | |
| 2009/0160400 A1 | 6/2009 | Woud | |
| 2009/0314400 A1 | 12/2009 | Liu | |
| 2010/0013431 A1 | 1/2010 | Liu | |
| 2010/0078343 A1 | 4/2010 | Hoellwarth et al. | |
| 2011/0122565 A1 | 5/2011 | Liu | |
| 2011/0134601 A1 | 6/2011 | Sa | |
| 2011/0159324 A1 | 6/2011 | Huang et al. | |
| 2011/0164375 A1* | 7/2011 | Hayashida | G06F 1/1632 |
| | | | 361/679.41 |
| 2011/0287726 A1 | 11/2011 | Huang | |
| 2011/0299238 A1 | 12/2011 | Radin et al. | |
| 2012/0018325 A1 | 1/2012 | Kim | |
| 2012/0043235 A1 | 2/2012 | Klement | |
| 2012/0088558 A1 | 4/2012 | Song | |
| 2012/0092377 A1* | 4/2012 | Stein | G06F 1/1626 |
| | | | 345/649 |
| 2012/0118773 A1 | 5/2012 | Rayner | |
| 2012/0161706 A1 | 6/2012 | Zhou | |
| 2012/0211382 A1 | 8/2012 | Rayner | |
| 2012/0250270 A1 | 10/2012 | Liu | |
| 2012/0261306 A1 | 10/2012 | Richardson et al. | |
| 2012/0298536 A1 | 11/2012 | Rauta et al. | |
| 2012/0303520 A1 | 11/2012 | Huang | |
| 2013/0002193 A1 | 1/2013 | Aldana et al. | |
| 2013/0023313 A1 | 1/2013 | Kim | |
| 2013/0033807 A1* | 2/2013 | Kim | G06F 1/1632 |
| | | | 361/679.01 |
| 2013/0088188 A1 | 4/2013 | Romanenko | |
| 2013/0092576 A1 | 4/2013 | Rayner | |
| 2013/0106353 A1 | 5/2013 | Foster | |
| 2013/0193006 A1 | 8/2013 | Bergreen et al. | |
| 2013/0220841 A1 | 8/2013 | Yang | |
| 2013/0222991 A1 | 8/2013 | McWilliams | |
| 2013/0258573 A1 | 10/2013 | Muday et al. | |
| 2013/0273752 A1 | 10/2013 | Rudisill et al. | |
| 2013/0273983 A1 | 10/2013 | Hsu | |
| 2013/0300267 A1 | 11/2013 | Richardson et al. | |
| 2013/0322568 A1 | 12/2013 | Pais et al. | |
| 2013/0331156 A1 | 12/2013 | Lui | |
| 2013/0334071 A1 | 12/2013 | Carnevali | |
| 2014/0035511 A1 | 2/2014 | Ferber et al. | |
| 2014/0036420 A1 | 2/2014 | Chen | |
| 2014/0042285 A1 | 2/2014 | Carnevali | |

| | | | |
|---|---|---|---|
| 2014/0055928 A1 | 2/2014 | Lee | |
| 2014/0059264 A1 | 2/2014 | Sudak | |
| 2014/0065948 A1 | 3/2014 | Huang | |
| 2014/0066144 A1 | 3/2014 | Hong | |
| 2014/0070774 A1 | 3/2014 | Terlizzi et al. | |
| 2014/0099526 A1 | 4/2014 | Powell et al. | |
| 2014/0168885 A1 | 6/2014 | Williams | |
| 2014/0191707 A1* | 7/2014 | Carreon | H02J 7/731 |
| | | | 320/107 |
| 2014/0244882 A1* | 8/2014 | Struthers | H04H 20/63 |
| | | | 710/303 |
| 2014/0307376 A1 | 10/2014 | Lee | |
| 2014/0347000 A1 | 11/2014 | Hamann et al. | |
| 2014/0363988 A1 | 12/2014 | An | |
| 2015/0011099 A1 | 1/2015 | Kim et al. | |
| 2015/0055289 A1 | 2/2015 | Chang et al. | |
| 2015/0098184 A1 | 4/2015 | Tsai et al. | |
| 2015/0146401 A1 | 5/2015 | Su et al. | |
| 2015/0189780 A1 | 7/2015 | Su et al. | |
| 2015/0270861 A1 | 9/2015 | Lin et al. | |
| 2016/0065702 A1 | 3/2016 | Carnevali | |
| 2016/0091926 A1* | 3/2016 | Saxton | G06F 1/1632 |
| | | | 710/304 |
| 2016/0231779 A1 | 8/2016 | Kaneko et al. | |
| 2016/0309010 A1 | 10/2016 | Carnevali | |
| 2017/0054312 A1 | 2/2017 | Kuchynka et al. | |
| 2017/0227987 A1 | 8/2017 | Carnevali et al. | |
| 2018/0279809 A1* | 10/2018 | Regan | A47F 5/13 |
| 2018/0314296 A1 | 11/2018 | Evns, V et al. | |
| 2019/0011952 A1* | 1/2019 | Galipeau | F16M 13/022 |
| 2019/0243419 A1* | 8/2019 | Charlesworth | H04B 1/385 |
| 2019/0267825 A1 | 8/2019 | Chien | |
| 2020/0195763 A1 | 6/2020 | Ellis | |
| 2020/0197563 A1 | 6/2020 | Shen et al. | |
| 2020/0326955 A1 | 10/2020 | Adiletta et al. | |
| 2020/0330037 A1 | 10/2020 | Al-Ali et al. | |
| 2020/0371555 A1 | 11/2020 | Huang et al. | |
| 2021/0048848 A1 | 2/2021 | Pischel | |
| 2021/0194256 A1 | 6/2021 | Carnevali | |
| 2021/0391678 A1 | 12/2021 | Carnevali | |
| 2021/0392773 A1 | 12/2021 | Carnevali | |
| 2022/0026951 A1 | 1/2022 | Wood, III et al. | |
| 2022/0066505 A1 | 3/2022 | Lu et al. | |
| 2022/0253097 A1 | 8/2022 | Carnevali et al. | |
| 2022/0352682 A1 | 11/2022 | Carnevali | |
| 2023/0039167 A1 | 2/2023 | Kamepalli et al. | |
| 2023/0045485 A1 | 2/2023 | Carnevali et al. | |
| 2023/0341897 A1 | 10/2023 | Carnevali et al. | |
| 2024/0006834 A1* | 1/2024 | Ferrier | F16M 11/16 |
| 2024/0399976 A1 | 12/2024 | Carnevali et al. | |
| 2024/0403251 A1 | 12/2024 | Anderson | |
| 2025/0224768 A1 | 7/2025 | Carnevali | |
| 2025/0226846 A1 | 7/2025 | Carnevali | |

FOREIGN PATENT DOCUMENTS

| | | |
|---|---|---|
| CN | 202268924 | 6/2012 |
| CN | 202565335 | 11/2012 |
| CN | 204334055 | 5/2015 |
| CN | 204334674 | 5/2015 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| KR | 101609754 B1 | 4/2016 |
| TW | 2003TW531119 | 5/2003 |
| TW | M422808 | 2/2012 |
| WO | 2012/052751 | 4/2012 |
| WO | 2013/081222 | 6/2013 |
| WO | 2014/010781 A1 | 1/2014 |
| WO | 2014/054426 | 4/2014 |
| WO | WO2014145748 A1 | 9/2014 |
| WO | 2015/022675 | 2/2015 |

OTHER PUBLICATIONS

U.S. Appl. No. 18/614,482, filed Mar. 22, 2024.

(56)     References Cited

OTHER PUBLICATIONS

U.S. Appl. No. 18/218,381, filed Jul. 5, 2023.
U.S. Appl. No. 18/233,218, filed Aug. 11, 2023.
MC40 Integrator Guide, Motorola Solutions, Inc., Oct. 4, 2013.
Various documents for iPort LaunchPort Product, alleged to have been available as early as 2013.
Juice Pack System Air Manual—Juice Pack System Air alleged to have been available as early as Feb. 6, 2013.
Juice Pack System Press Releases dated Jun. 14, 2011; Jun. 19, 2012; and Feb. 6, 2013.
Juice Pack System Dock Manual—Juice Pack System Dock alleged to have been available as early as Feb. 6, 2013.
Juice Pack System images—Juice Pack System alleged to have been available as early as Feb. 6, 2013.
Juice Pack System Helium Manual—Juice Pack System Helium alleged to have been available as early as Feb. 6, 2013.
Juice Pack System Add-Ons—Juice Pack System alleged to have been available as early as Feb. 6, 2013.
Juice Pack System Plus iPhone 6 Manual—Juice Pack System Plus alleged to have been available as early as Feb. 6, 2013.
Juice Pack System Dock Page IA—Juice Pack System Dock alleged to have been available as early as Feb. 6, 2013.
Wildcharge System reviews—Wildcharge System alleged to have been available as early as Mar. 23, 2008.
Wildcharge System articles dated Mar. 23, 2008; Jun. 23, 2009; and Sep. 2009.
Wildcharge System webpages—Wildcharge System alleged to have been available as early as Mar. 23, 2008 and these webpages alllegedly are from 2009 and 2010.
Wildcharge System Press Release from Nov. 13, 2007.
Wildcharge System WildCharge Wire Free Power alleged to have been available as early as Mar. 23, 2008.
Wildcharge System WildCharge Skin for iPhone alleged to have been available as early as Mar. 23, 2008.
Wildcharge System images—Wildcharge System alleged to have been available as early as Mar. 23, 2008.
Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.
Officeonthego.com, 3 pages of product description of Magnifico® PLUS screen magnifier product information retrieved from web site at: www.officeonthego.com.
2 pages of product information for Armor 1600 and Armor 1601 waterproof, dustproof and airtight protective cases.
2 pages Otterox 4600 Tablet PC Case protective cases product information retrieved from web site at: www.otterbox.com.
Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].
Battery Charging Specification (Including errata and ECNs through Mar. 15, 2012); Revision 1.2, Mar. 15, 2012. 72 pages.
U.S. Appl. No. 18/590,837, filed Feb. 28, 2024.
U.S. Appl. No. 18/612,977, filed Mar. 21, 2024.

* cited by examiner

DOCK WITH A ROTATABLE MOUNT FOR MOBILE DEVICES AND METHODS OF MAKING AND USING

FIELD

The present invention is directed to a dock with a rotatable mount for a mobile device. The present invention is also directed to a dock for a mobile device that is capable of mounting on a wall or other surface.

BACKGROUND

Mobile devices, such as smartphones, cellular or mobile phones, tablets, personal data assistants, and other portable devices, are now ubiquitous. Docks can be used to protect the mobile device, to mount the mobile device onto a surface or object, or to provide power, or data to or from, the mobile device, or any combination thereof.

BRIEF SUMMARY

One embodiment is a dock for a mobile device. The dock includes a base configured for attachment to a wall or other surface; a rotatable mount rotatably coupled to the base, the rotatable mount including an anchoring mount and a bottom device receiver coupled to the anchoring mount, wherein the rotatable mount further includes either a) a docking button indentation defined in the anchoring mount and configured for receiving a docking button coupled to the mobile device or b) a docking button extending from a remainder of the anchoring mount, wherein the bottom device receiver is configured to receive a bottom portion of the mobile device or a case containing the mobile device, wherein at least one of the bottom device receiver, the docking button indentation, or the docking button includes a plurality of electrical contacts configured for making contact with contacts on the mobile device or the case containing the mobile device; and a cord electrically coupled to at least one of the electrical contacts, extending into the base, and configured for coupling to a power source, a data source, or a data receiver.

Another embodiment is a dock for a mobile device. The dock includes a base configured for attachment to a wall or other surface; a rotatable mount rotatably coupled to the base, the rotatable mount including an anchoring mount and a bottom device receiver coupled to the anchoring mount, the anchoring mount defining a docking button indentation for receiving a docking button coupled to the mobile device, wherein the bottom device receiver includes a plurality of electrical contacts configured for making contact with contacts on the mobile device or the case containing the mobile device; and a cord electrically coupled to at least one of the electrical contacts, extending into the base, and configured for coupling to a power source, a data source, or a data receiver.

In at least some embodiments, the base includes a wall box configured for insertion into a wall or other surface. In at least some embodiments, the base further includes a power supply or a power over internet (PoE) injector, wherein the power supply or POE injector is electrically coupled to the cord.

In at least some embodiments, the docking button indentation has a polygonal lateral cross-sectional shape. In at least some embodiments, the polygonal lateral cross-sectional shape is selected from triangular, square, rectangular, rhomboidal, trapezoidal, pentagonal, hexagonal, octagonal, or decagonal.

In at least some embodiments, one of the base or rotatable mount defines a track and another one of the base or rotatable mount defines a pin arranged for traveling along the track to limit rotation of the rotatable mount relative to the base. In at least some embodiments, the rotatable mount or base is capable of, and limited to, a rotation of 180 degrees. In at least some embodiments, the rotatable mount or base is capable of, and limited to, a rotation of 90 degrees.

In at least some embodiments, the base and rotatable mount include at least one detent for maintaining at least one desired rotation position of the rotatable mount relative to the base. In at least some embodiments, the docking button indentation or docking button includes a magnet or magnetically-attracted piece configured for magnetically coupling to a magnet or magnetically-attracted piece of the mobile device or case containing the mobile device to removably attach the mobile device to the dock.

A further embodiment is a system that includes any of the docks described above and the mobile device.

Yet another embodiment is a method for attaching a mobile device to a wall or other surface. The method includes removably attaching the mobile device to the dock of claim 1 which is attached to the wall or other surface and rotating the mobile device, while attached to the dock, relative to the wall or other surface.

In at least some embodiments, rotating the mobile device comprises rotating the mobile device at least 90 degrees. In at least some embodiments, the method further includes charging the mobile device using the dock.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to a dock with a rotatable mount for a mobile device. The present invention is also directed to a dock for a mobile device that is capable of mounting on a wall or other surface.

Figures 1A, 1B:
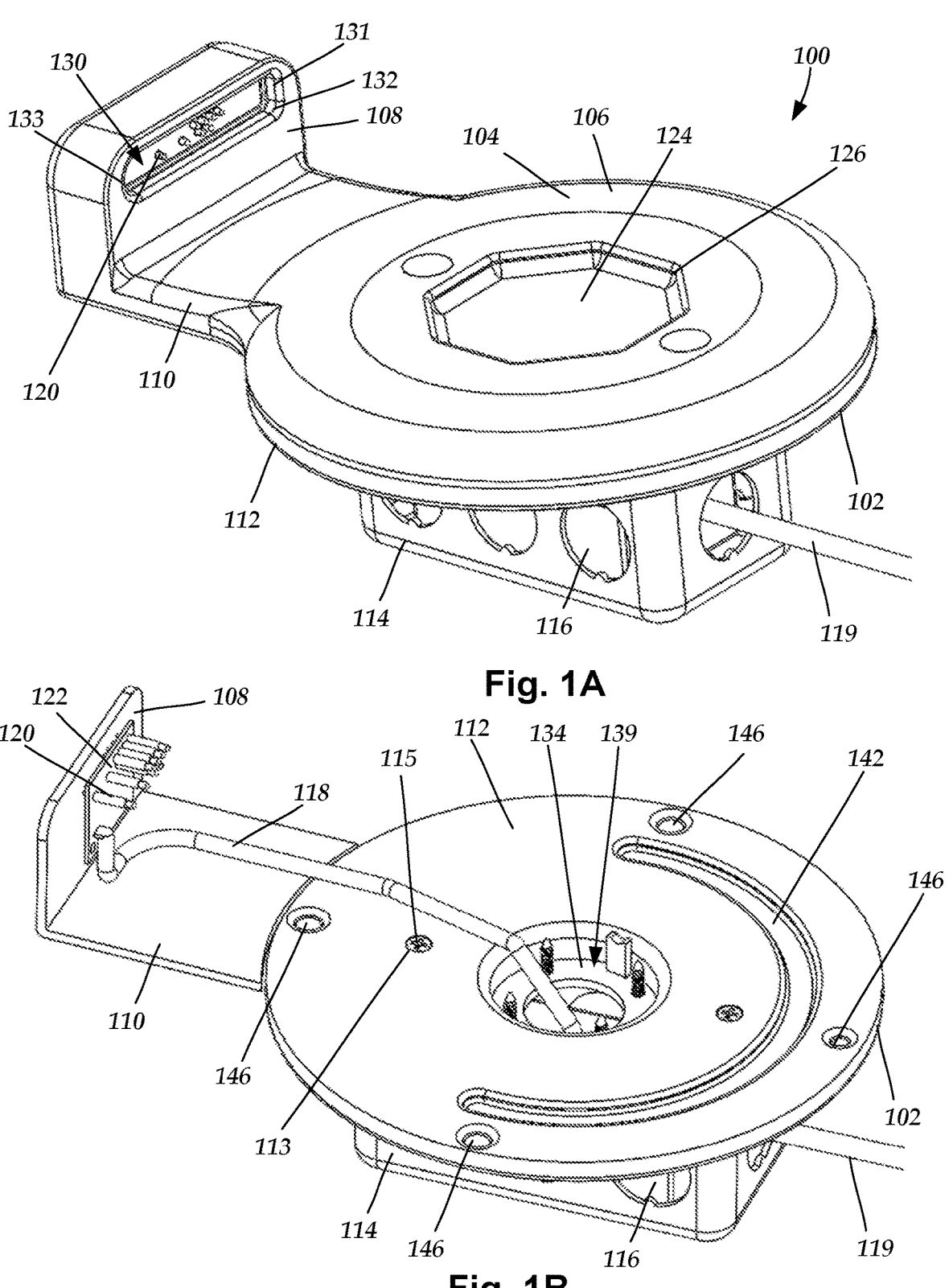
FIG. 1A is a schematic perspective side view of one embodiment of a dock for a mobile device, according to the invention.
FIG. 1B is a schematic perspective side view of one embodiment of a body of the dock of FIG. 1A.
Figures 1C, 1D, 1E:
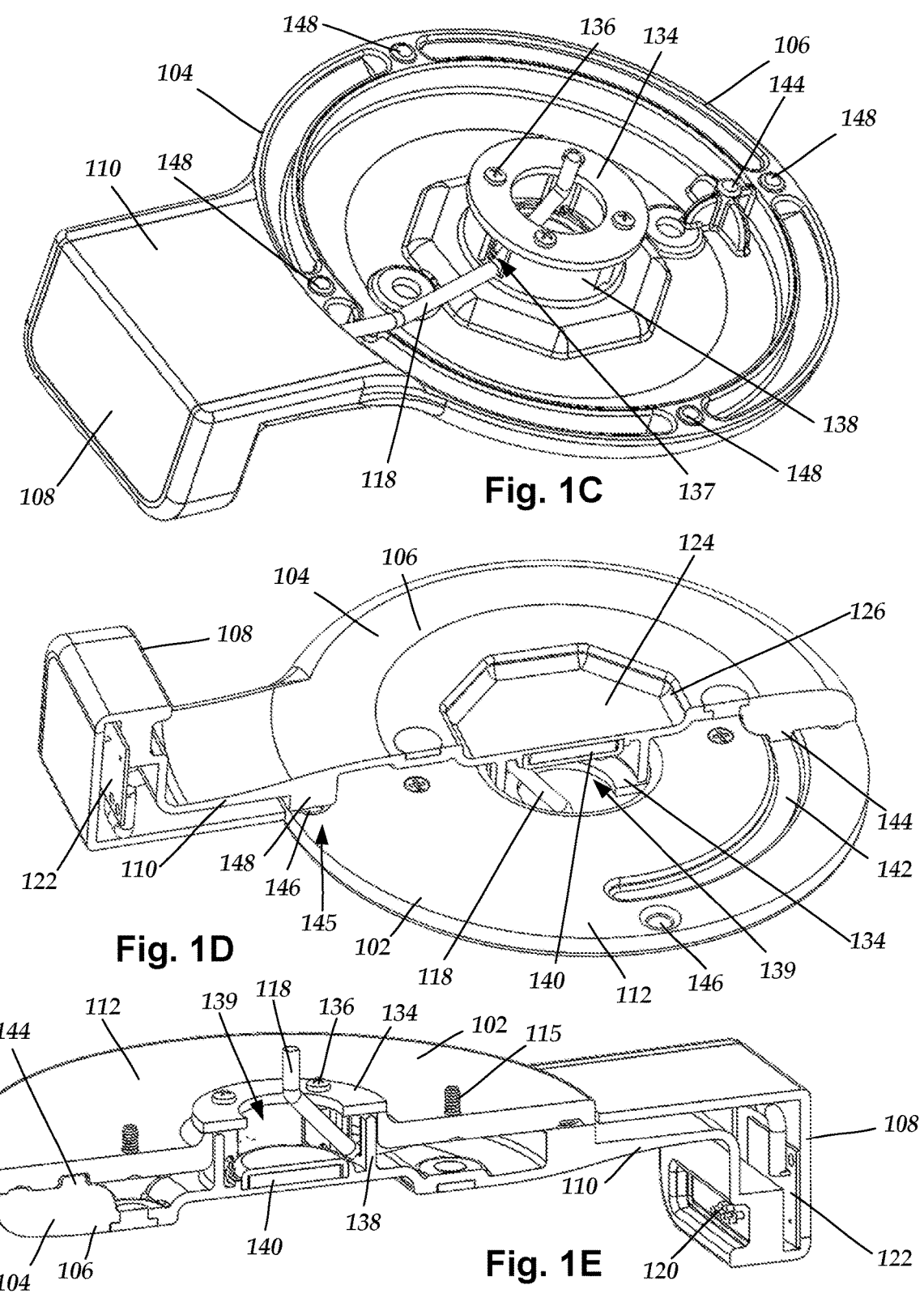
FIG. 1C is a schematic perspective bottom view of one embodiment of a rotatable mount of the dock of FIG. 1A.
FIG. 1D is a schematic partial cross-sectional perspective side view of one embodiment of the dock of FIG. 1A.
FIG. 1E is a schematic cross-sectional perspective bottom view of one embodiment of the dock of FIG. 1A.
Figures 2A, 2B:
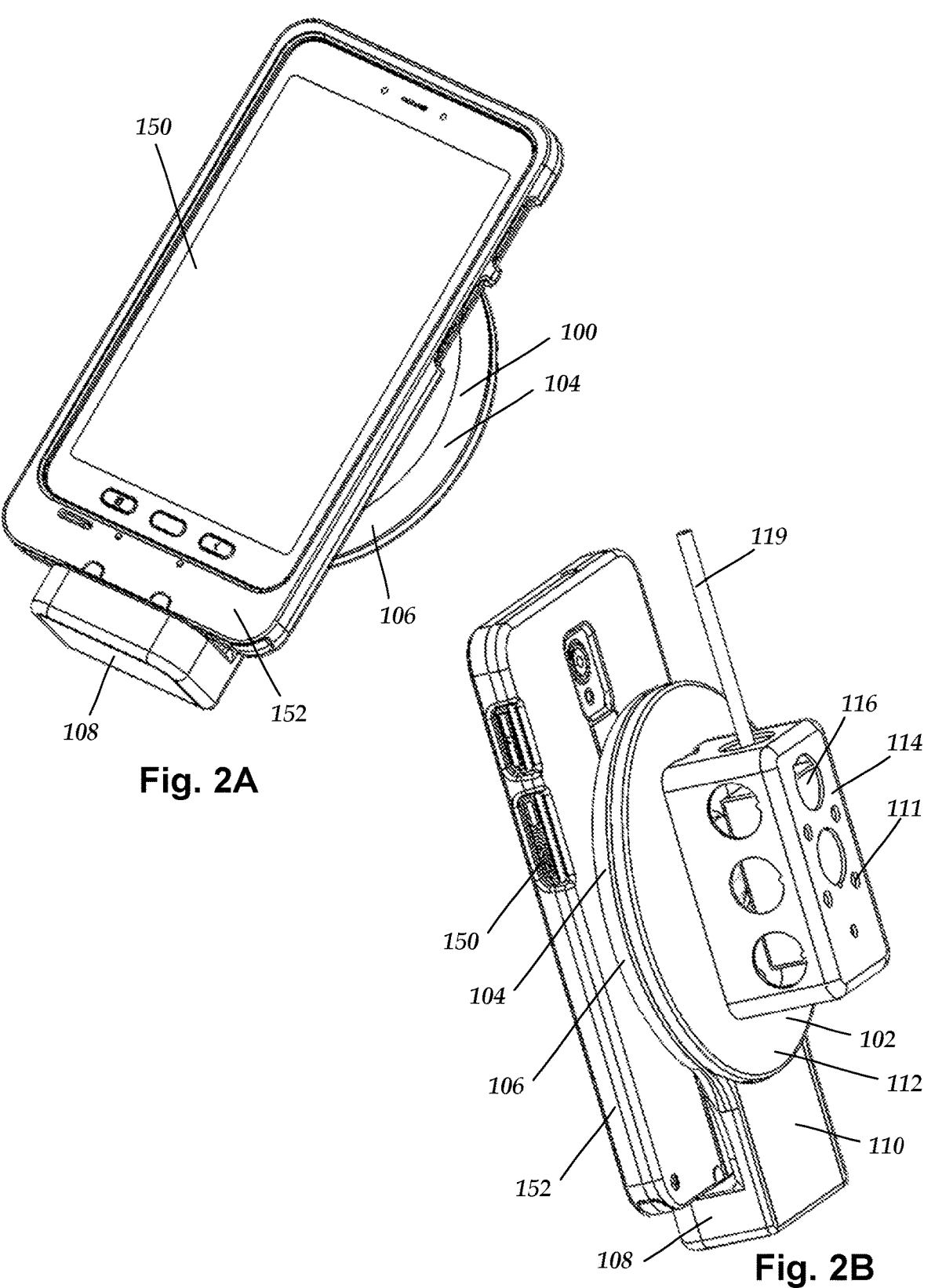
FIG. 2A is a schematic perspective front view of a mobile device contained within a case and attached to the dock of FIG. 1A, according to the invention.
FIG. 2B is a schematic perspective front view of the mobile device contained within the case and attached to the dock of FIG. 1A, according to the invention.
Figures 2C, 2D, 2E:
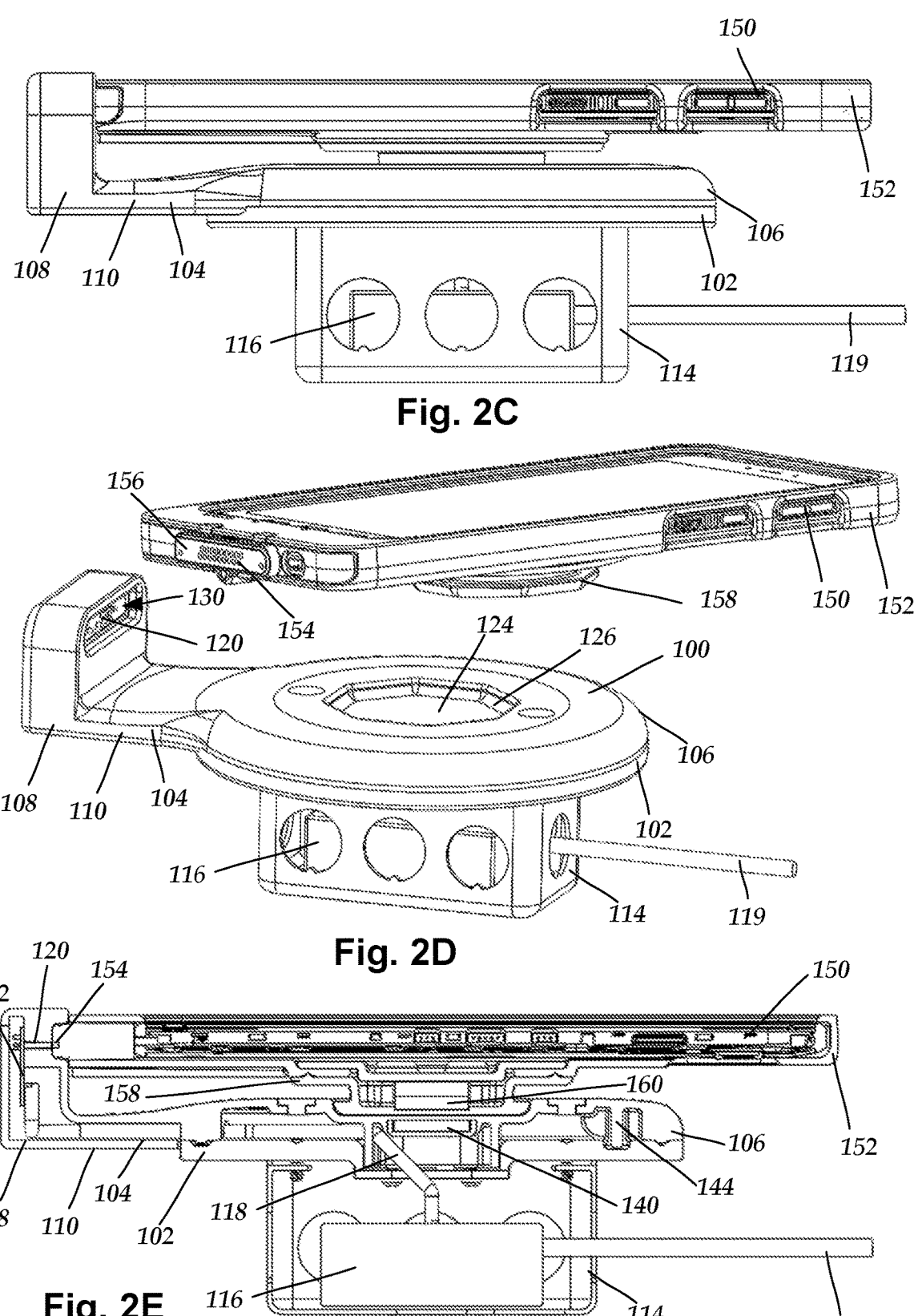
FIG. 2C is a schematic perspective side view of the mobile device contained within the case and attached to the dock of FIG. 1A, according to the invention.
FIG. 2D is a schematic perspective side view of the mobile device contained within the case prior to attachment to the dock of FIG. 1A, according to the invention.
FIG. 2E is a schematic cross-sectional side view of the mobile device contained within the case and attached to the dock of FIG. 1A, according to the invention.

FIGS. 1A to 1E illustrate one embodiment of a dock 100 for a mobile device 150 (FIG. 2A), such as a cellular or mobile phone, a smartphone, a tablet, a personal data assistant, or any other suitable mobile device. The dock 100 includes a base 102 for attachment to a wall or other surface and a rotatable mount 104 coupled to, and rotatable relative to, the base. The rotatable mount 104 includes an anchoring body 106 for attachment of the mobile device to the dock and a bottom device receiver 108 that is coupled directly or indirectly (e.g., through a neck 110) to the anchoring body and arranged for receiving a bottom side of the mobile device. FIG. 1B illustrates one embodiment of the base 102. FIG. 1C illustrates one embodiment of the rotatable mount 104. FIGS. 1D and 1E are respectively partial and full cross-sectional views of at least a portion of the dock 100. FIGS. 2A to 2C illustrate a mobile device 150 contained within a case 152 and attached to the dock 100. FIG. 2D illustrates the mobile device 150 prior to being received by the dock 100. FIG. 2E is a cross-sectional view of the mobile device 150 and dock 100.

In at least some embodiments, the base 102 is mountable to a wall or other surface so that the mobile device 150, anchored or otherwise attached to the rotatable mount 104, can be rotated relative to the wall or other surface while remaining attached to the wall or other surface. In at least some embodiments, the base 102 includes a panel 112 and a wall box 114. In at least some embodiments, a power supply 116 or other power source, such as a power over ethernet (POE) injector), is disposed in the wall box 114 as illustrated in FIG. 1B. In at least some embodiments, the dock 100 does not include a wall box 114 such as, for example, in situations where electrical codes do not require a wall box or where the power source or other coupling for the dock is a POE injector, a low voltage source or coupling, a data coupling, or the like or any combination thereof.

In a least some embodiments, the wall box 114 is configured for insertion into an opening in a wall or other surface, for example, an opening for a wall power outlet or the like. In at least some embodiments, the wall box 114 includes one or more openings 111 for receiving a fastener 115, such as a nail, bolt, screw, or the like, for fastening the wall box to the wall or other surface. Alternatively or additionally, the panel 112 includes one or more openings for receiving a fastener, such as a nail, bolt, screw, or the like, for fastening the panel to the wall or other surface. In at least some embodiments, the panel 112 can include one or more openings 113 and one or more fasteners 115, such as, for example, screws, bolts, pins, tabs, or the like, for attaching the wall box 114 to the panel 112.

The dock 100 includes a cord 118 extending from the bottom device receiver 108 through the base 102. In at least some embodiments, the cord 118 is coupled to a power supply 116 (or PoE injector or other power source or data source) disposed in the wall box 114. The cord can be hardwired to the power supply 116 (or POE injector or other power source or data source) or can have a connector for coupling to a connector of the power supply 116 (or POE injector or other power source or data source). In at least some embodiments, the power supply 116 is coupled to another cord 119 that extends directly or indirectly from a power source to the power supply 116. In at least some embodiments, the power supply 116 or other power source can also be a data source or data receiver or can be coupled to a data source or a data receiver (for example, via an ethernet cable or other connection). In at least some embodiments, the power supply 116 or other power source is replaced by, or accompanied by, a data source or data receiver or a connector, coupled or coupleable, to a data source or a data receiver. The cords 118, 119 can be used to provide power or data or both to, or from, the mobile device 150 via the dock 100.

The bottom device receiver 108 is attached to the anchoring body 106 directly or indirectly through an optional neck 110. The bottom device receiver 108 may be integrally formed with (e.g., permanently attached to or permanently part of) the anchoring body 106 (or the neck 110 or both) or may be detachable from the anchoring body (or the neck). In at least some embodiments, the bottom device receiver 108 includes one or more contacts 120 for making electrical contact with contacts 154 (FIG. 2D) of a mobile device 150 (FIG. 3A) or a case 152 (FIG. 3A) containing the mobile device. The contacts 120 are electrically coupled to the cord 110 to provide power to the mobile device 150 or provide data to or from the mobile device or any combination thereof. The contacts 120 may be disposed on, or attached to, a substrate 122, such as, for example, a printed circuit board with the bottom device receiver 108 forming a housing around the substrate.

Any arrangement of the contacts 120 can be used including, but not limited to, an arrangement of the contacts in one or more rows. When the arrangement includes two or more rows, the contacts in the rows can be aligned or staggered relative to each other. In other embodiments of the dock 100, the contacts 120 can be positioned anywhere in or on the rotatable mount 104 such as, for example, in or on the anchoring body 106. In at least some embodiments, the contacts 120 are pogo pins or other biasing contacts that can move up or down relative to the rotatable mount 104 such as, for example, the bottom device receiver 108.

The contacts 120 make electrical contact with contacts 154 (FIG. 2D) on the mobile device 150 or a case 152 disposed on the mobile device when the mobile device is inserted into (e.g., received by) the dock 100. Examples of cases with contacts include, but are not limited to, the cases, covers, or skins described in U.S. Pat. Nos. 9,195,279; 9,331,444; 9,529,387; 9,602,639; 9,632,535; 9,706,026; 10,050,658; 10,054,984; 10,389,399; 10,454,515; and 10,630,334 and U.S. patent application Ser. Nos. 16/853,544 and 16/866,156, all of which are incorporated herein by reference in their entireties. The contacts 120 of the dock 100 can be used to provide power to the mobile device 150 from a power source, transfer data between the mobile device and a data source or data receiver, or any combination of these functions.

In at least some embodiments, the bottom device receiver 108 forms a housing (e.g., for the substrate 122 and a portion of the cord 118) that defines a recess 130 surrounded by a rim 132 that may facilitate retention of the mobile device in the dock 100. In at least some embodiments, the recess 130, rim 132, and contacts 120 define a female connector. In at least some embodiments, the shape of the recess 130 and rim 132 are complementary to a male structure 156 (FIG. 2D) of a case 152 (see, for example, the cases, covers, or skins in the references cited above) or mobile device 150. In at least some embodiments, the recess 130 and rim 132 have a straight side 131 and an opposing curved side 133 to or other asymmetric shape.

In at least some embodiments, the anchoring body 106 defines a docking button indentation 124 to receive a docking button 158 (FIG. 2D) attached to the mobile device 150 or a case 152 containing the mobile device. In other embodiments, the anchoring body 106 includes a docking button and the mobile device 150 or case 152 defines the docking button indentation. Non-limiting examples of docking buttons 158 and docking button indentations 124 can be found in U.S. patent application Ser. No. 18/612,977, which is incorporated herein by reference in its entirety.

In at least some embodiments, the docking button indentation 124 of the anchoring body 106 has an indentation perimeter 126 and a lateral cross-sectional shape and the docking button 158 has a lateral cross-sectional shape complementary to the indentation perimeter or the lateral cross-sectional shape of the docking button indentation. In at least some embodiments, the docking button indentation 124 has a non-circular indentation perimeter 126 or non-circular lateral cross-sectional shape and the docking button 158 has a non-circular lateral cross-sectional shape. In at least some embodiments, the non-circular shapes facilitate maintaining alignment of the mobile device 150 with the dock 100 because the docking button 158 is not rotatable within the docking button indentation 124. Examples of indentation perimeter shapes and lateral cross-sectional shapes of a docking button indentation 124, as well as lateral cross-sectional shapes of a docking button 158, include, but are not limited to, circular, oval, triangular, square, rectangular, rhomboidal, trapezoidal, pentagonal, hexagonal, octagonal (as illustrated in FIG. 1A), decagonal, or the like. In at least some embodiments, the indentation perimeter shape and lateral cross-sectional shape of the docking button indentation 124 and the lateral cross-sectional shape of the docking button 158 are polygonal, regular polygonal, or irregular polygonal. In at least some embodiments, the indentation perimeter shape and lateral cross-sectional shape of the docking button indentation 124 and the cross-sectional shape of the docking button 158 facilitate retention or alignment of the mobile device 150 on the dock 100.

It will also be understood that the docking button indentation 124 and docking button 158 can include contacts in addition to, or as an alternative to, the contacts 120 of the dock 100 and contacts 154 at the bottom of the mobile device 150 or case 152 to provide power to the mobile device or transfer data to or from the mobile device. Non-limiting examples of docking buttons 158 and docking button indentations 124 with contacts can be found in U.S. patent application Ser. No. 18/612,977, which is incorporated herein by reference in its entirety.

FIG. 2E illustrates one embodiment of the attachment of the docking indentation 124 of the dock 100 to the docking button 158 of the mobile device 150 or case 152 using one or more magnets 140 in the dock and one or more magnets 160 in the mobile device or case. In at least some embodiments, one or more of the magnets 140 or the magnets 160 are individually replaced with a magnetically-attracted piece, such as an iron, steel, nickel, or cobalt piece or the like, so that there is at least one complementary magnet/magnetically-attracted-piece pair when the dock 100 is coupled to the mobile device 150 or case 152. In at least some embodiments, the magnets 140, 160 (and magnetically-attracted pieces) are fully or partially embedded in the material of the dock 100 or mobile device 150 or case 152. Any other suitable arrangement can be used to couple the docking indentation 124 of the dock 100 to the docking button 158 of the mobile device 150 or case 152 including any suitable mechanical coupling arrangement, such as, for example, a latch as described in U.S. patent application Ser. No. 18/612,977, which is incorporated herein by reference in its entirety.

Figures 3A, 3B:
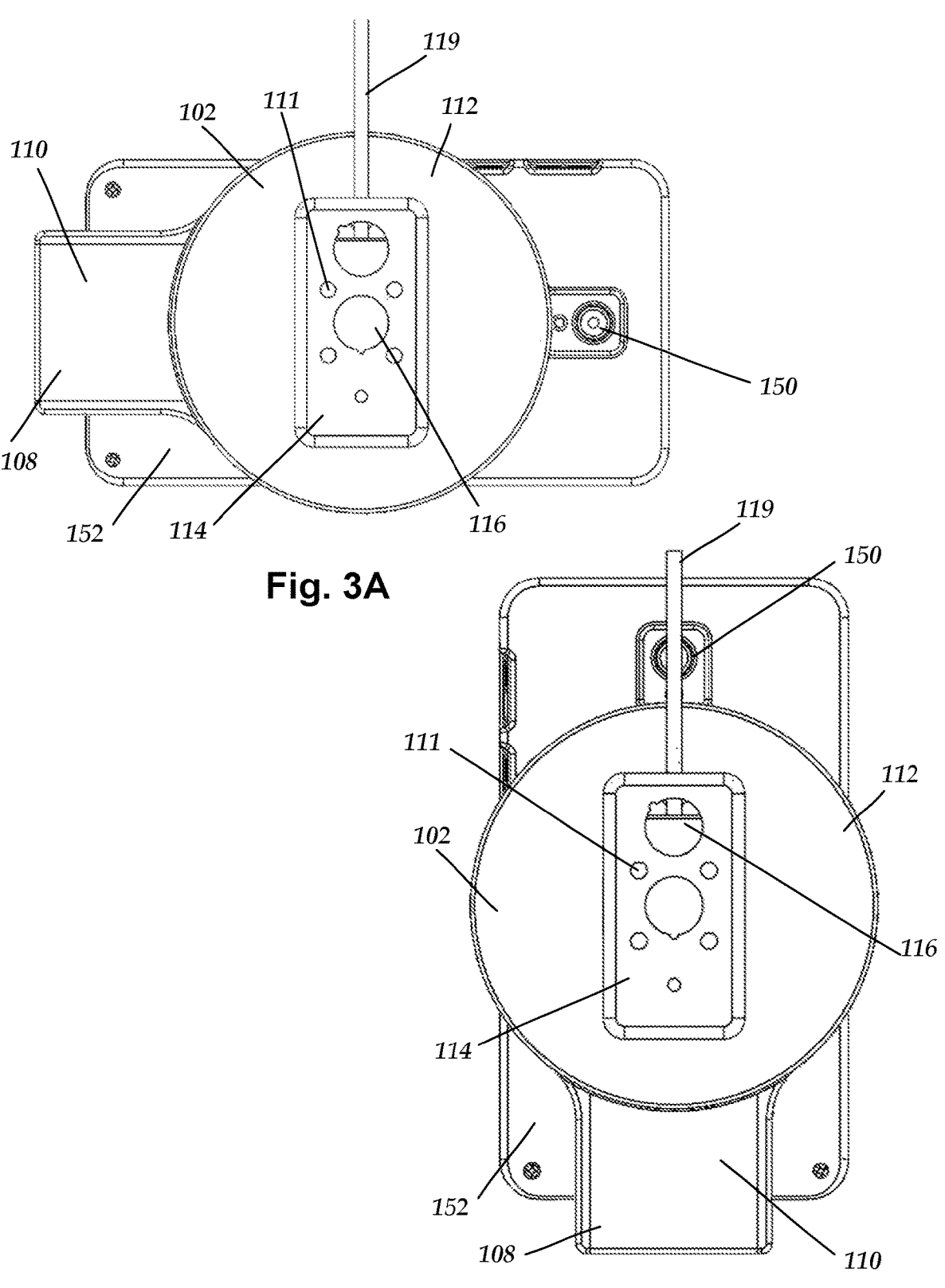
FIG. 3A is a schematic back view of the mobile device attached to the dock of FIG. 1A in a horizontal position (relative to the page), according to the invention.
FIG. 3B is a schematic back view of the mobile device attached to the dock of FIG. 1A in a vertical position (relative to the page), according to the invention.

The rotatable mount 104 is rotatable relative to the base 102, as illustrated in FIGS. 3A and 3B, in which the mobile device 150 is rotated by at least 90 or 180 degrees. For example, FIGS. 3A and 3B illustrate the mobile device 150 in a horizontal or vertical position (from the perspective of the page of the Figures).

Any mechanism can be used to provide a rotational coupling between the body 102 and the rotatable mount 104. In the illustrated embodiment, the dock 100 includes a mounting ring 134 that is attached to the rotatable mount 104 by one or more fasteners 136 and which rotatably attaches the rotatable mount 104 to the body 102, as illustrated in FIG. 1E. In the illustrated embodiment, the mounting ring 134 is a ring that attaches to a flange 138 of the anchoring body 106 of the rotatable mount 104 using the fasteners, as illustrated in FIG. 1C. The flange 138 of the anchoring body 106 of the rotatable mount 104 has a diameter selected so that the flange can extend into an opening 139 defined by the panel 112 of the body 102. The mounting ring 134 has an outer diameter larger than the outer diameter of the opening 139. In at least some embodiments, the flange 138 includes one or more openings 137 for passage of the cord 118 through the flange 138 into the opening 139 to allow passage of the cord through the body 102 of the dock 100, as illustrated in FIG. 1C.

In the illustrated embodiment of FIGS. 1A to 1D, the panel 112 includes at least one track 142 (FIGS. 1B and 1D), such as a groove, and the anchoring body 106 includes at least one pin 144 (FIGS. 1C and 1D) that is positioned to travel along the track as the rotatable mount 104 is rotated. The track 142 can limit the rotation of the rotatable mount 104 and provide stops to rotation. In the illustrated embodiment, the track 142 and pin 144 limit rotation to 180 degrees (or 170, 175, 185, or 190 degrees or less). Any other suitable limit on the range of rotation can be used.

In at least some embodiments, the panel 112 includes one or more detents 145 for selected orientations of the rotatable mount 104 relative to the body 102. In at least some embodiments, each detent includes an indentation 146 on the panel 112 and protuberance 148 on the anchoring body 106. The protuberance 148 is shaped to fit in the indentation 146. In the illustrated embodiment, there are four indentations 146 on the panel and four protuberances 148 on the anchoring body and these are positioned at 90 degree intervals around the rotatable mount 146 and body 102. This arrangement facilitates positioning the mobile device 150 in the horizontal and vertical positions illustrated in FIGS. 3A and 3B. The detents 145 resist rotation of the mobile device 150 away from these preferred positions and the depth and size of the indentations 146 are selected to provide an amount of resistance, which, at least in some embodiments, is more than the expected gravitational force or other rotational force that is not provided by ta user. It will be understood that the location of any particular track 142, pin 144, indentation 146, or protuberance 148 can be on either the panel 112 and the rotatable mount 104 to provide opposing track/pin or indentation/protuberance pairs.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A dock for a mobile device, the dock comprising:
a base configured for attachment to a wall or other surface;
a rotatable mount rotatably coupled to the base, the rotatable mount comprising an anchoring mount and a bottom device receiver coupled to the anchoring mount, wherein the rotatable mount further comprises a docking button indentation defined in the anchoring mount and configured for receiving a docking button coupled to the mobile device, wherein the bottom device receiver is spaced apart from the docking button indentation and is configured to receive a bottom portion of the mobile device or a case containing the mobile device, wherein at least one of the bottom device receiver or the docking button indentation comprises a plurality of electrical contacts configured for making contact with contacts on the mobile device or the case containing the mobile device; and
a cord electrically coupled to at least one of the electrical contacts, extending into the base, and configured for coupling to a power source, a data source, or a data receiver.

2. The dock of claim 1, wherein the base comprises a wall box configured for insertion into a wall or other surface.

3. The dock of claim 2, wherein the base further comprises a power supply or a power over internet (PoE) injector, wherein the power supply or POE injector is electrically coupled to the cord.

4. The dock of claim 1, wherein the docking button indentation has a polygonal lateral cross-sectional shape.

5. The dock of claim 4, wherein the polygonal lateral cross-sectional shape is selected from triangular, square, rectangular, rhomboidal, trapezoidal, pentagonal, hexagonal, octagonal, or decagonal.

6. The dock of claim 1, wherein one of the base or rotatable mount defines a track and another one of the base or rotatable mount defines a pin arranged for traveling along the track to limit rotation of the rotatable mount relative to the base.

7. The dock of claim 1, wherein the rotatable mount or base is capable of, and limited to, a rotation of 180 degrees.

8. The dock of claim 1, wherein the rotatable mount or base is capable of, and limited to, a rotation of 90 degrees.

9. The dock of claim 1, wherein the base and rotatable mount comprise at least one detent for maintaining at least one desired rotation position of the rotatable mount relative to the base.

10. The dock of claim 1, wherein the docking button indentation includes a magnet or magnetically-attracted piece configured for magnetically coupling to a magnet or magnetically-attracted piece of the mobile device or case containing the mobile device to removably attach the mobile device to the dock.

11. A system, comprising:
the dock of claim 1; and
the mobile device.

12. A method for attaching a mobile device to a wall or other surface, the method comprising:
removably attaching the mobile device to the dock of claim 1 which is attached to the wall or other surface; and
rotating the mobile device, while attached to the dock, relative to the wall or other surface.

13. The method of claim 12, wherein rotating the mobile device comprises rotating the mobile device at least 90 degrees.

14. The method of claim 12, further comprising charging the mobile device using the dock.

15. A dock for a mobile device, the dock comprising:
a base configured for attachment to a wall or other surface;
a rotatable mount rotatably coupled to the base, the rotatable mount comprising an anchoring mount and a bottom device receiver coupled to the anchoring mount, the anchoring mount defining a docking button indentation for receiving a docking button coupled to the mobile device, wherein the bottom device receiver is spaced apart from the docking button indentation and comprises a plurality of electrical contacts configured for making contact with contacts on the mobile device or the case containing the mobile device; and
a cord electrically coupled to at least one of the electrical contacts, extending into the base, and configured for coupling to a power source, a data source, or a data receiver.

16. The dock of claim 15, wherein the base comprises a wall box configured for insertion into a wall or other surface.

17. The dock of claim 16, wherein the base further comprises a power supply or a power over internet (PoE) injector, wherein the power supply or POE injector is electrically coupled to the cord.

18. The dock of claim 15, wherein the docking button indentation includes a magnet or magnetically-attracted piece configured for magnetically coupling to a magnet or magnetically-attracted piece of the mobile device or case containing the mobile device to removably attach the mobile device to the dock.

19. The dock of claim 15, wherein one of the base or rotatable mount defines a track and another one of the base or rotatable mount defines a pin arranged for traveling along the track to limit rotation of the rotatable mount relative to the base.

20. The dock of claim 15, wherein the base and rotatable mount comprise at least one detent for maintaining at least one desired rotation position of the rotatable mount relative to the base.

* * * * *